(12) United States Patent
Adachi

(10) Patent No.: US 11,528,423 B2
(45) Date of Patent: Dec. 13, 2022

(54) APPARATUS, METHOD, AND STORAGE MEDIUM

(71) Applicant: CANON KABUSHIKI KAISHA, Tokyo (JP)

(72) Inventor: Keiji Adachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/339,831

(22) Filed: Jun. 4, 2021

(65) Prior Publication Data

US 2021/0392273 A1 Dec. 16, 2021

(30) Foreign Application Priority Data

Jun. 11, 2020 (JP) .............................. JP2020-101485

(51) Int. Cl.
*H04N 5/232* (2006.01)
*G06V 20/52* (2022.01)

(52) U.S. Cl.
CPC ....... *H04N 5/232945* (2018.08); *G06V 20/52* (2022.01); *H04N 5/23219* (2013.01); *H04N 5/232933* (2018.08)

(58) Field of Classification Search
CPC ......... H04N 5/232945; H04N 5/23219; H04N 5/232933; H04N 5/23206; H04N 5/23229; H04N 5/232939; H04N 7/18; H04N 21/00; G06V 20/52; G01S 3/00; G06T 7/00

See application file for complete search history.

(56) References Cited

U.S. PATENT DOCUMENTS

2014/0019907 A1* 1/2014 Lin ...................... G06F 3/0482
  715/790
2018/0328845 A1* 11/2018 Safai ..................... G01N 21/94

FOREIGN PATENT DOCUMENTS

JP        2007199311 A        8/2007

* cited by examiner

*Primary Examiner* — Yogesh K Aggarwal
(74) *Attorney, Agent, or Firm* — Canon U.S.A., Inc. IP Division

(57) ABSTRACT

An apparatus includes a first acquisition unit configured to acquire an image, an analysis unit configured to perform an analysis process on the acquired image, a second acquisition unit configured to acquire a parameter for use in the analysis process on the image, a third acquisition unit configured to acquire superimposition information superimposed on the acquired image, an identification unit configured to, based on the acquired parameter, identify superimposition information that influences the analysis process on the image, and a processing unit configured to perform a process regarding drawing of the identified superimposition information.

19 Claims, 19 Drawing Sheets

FIG.5

| ID | Type | Source ID | Area | Margin | Attribute | Action | ... |
|---|---|---|---|---|---|---|---|
| 1 | Human Body Detection | 5 | all | 0 | Human Body | Notification | ... |
| 2 | Passage Detection | 6 | (x,y),(x,y) | 10 | Human Body | Notification | ... |
| 3 | Intrusion Detection | 1 | (x,y),(x,y), (x,y),(x,y) | 10 | Human Body | Notification | ... |
| 4 | Prank Detection | 7 | all | 0 | Moving Body | Notification | ... |

FIG.6

| ID | Source ID | Type | Position | TextString | Font | Color | BackgroundColor | ... |
|----|-----------|------|----------|------------|------|-------|-----------------|-----|
| | | | | | 61 | 62 | 63 | 64 65 |
| 1 | 1 | Text | (x,y),(x,y) | 2020/01/23\r\n12:34:56 | Size | Color | Transparent,Color | ... |
| 2 | 1 | Text | (x,y),(x,y) | Camera-01 | Size | Color | Transparent,Color | ... |
| 3 | 2 | Text | (x,y),(x,y) | Parking Lot Entrance Camera 01 | Size | Color | Transparent,Color | ... |
| 4 | 3 | Text | (x,y),(x,y) | IN 100 People\␣nOUT 200 People | Size | Color | Transparent,Color | ... |
| 5 | 4 | Text | (x,y),(x,y) | Analysis Server 1 | Size | Color | Transparent,Color | ... |

| ID | IP | Port | Name | Sequence | Analysis |
|----|----|----|----|----|----|
| 1 | xxx.xxx.xxx.xxx | 10000 | Camera-01 | 0 | 0 |
| 2 | xxx.xxx.xxx.xxx | 10001 | RecordingServer01 | 1 | 0 |
| 3 | xxx.xxx.xxx.xxx | 10002 | AnalysisServer01 | 2 | 1 |
| 4 | xxx.xxx.xxx.xxx | 10003 | AnalysisViewer01 | 3 | 0 |

FIG.9

CURRENTLY DISPLAYED OSD MAY
INFLUENCE ANALYSIS.
CHANGING DISPLAY OF OSD ON CAMERA
BEFORE CONTINUING ANALYSIS SETTING
IS RECOMMEND.
— 90

FIG.17

| ID | Source ID | Type | Position | TextString | Font | | | |
|---|---|---|---|---|---|---|---|---|
| | | | | | | Color | BackgroundColor | ... |
| | | | | | Size | | | |
| | | | | | | | | ... |
| 1 | 1 | Text | (x,y),(x,y) | 2020/01/23\r\n12:34:56 | Size | Color | Transparent,Color | ... |
| 2 | 4 | Text | (x,y),(x,y) | Camera-01 | Size | Color | Transparent,Color | ... |
| 3 | 4 | Text | (x,y),(x,y) | Parking Lot Entrance Camera 01 | Size | Color | Transparent,Color | ... |
| 4 | 3 | Text | (x,y),(x,y) | IN 100 People\r\nOUT 200 People | Size | Color | Transparent,Color | ... |
| 5 | 4 | Text | (x,y),(x,y) | Analysis Server 1 | Size | Color | Transparent,Color | ... |

APPARATUS, METHOD, AND STORAGE MEDIUM

BACKGROUND OF THE DISCLOSURE

Field of the Disclosure

The aspect of the embodiments relates to an apparatus, a method, and a storage medium.

Description of the Related Art

In a monitoring camera system, there is known an image processing technique for performing an image analysis/recognition process on an image captured by a network camera, thereby detecting and recognizing an object and a person in the image, counting the number of people, detecting an intrusion, and detecting a prank.

In such a monitoring camera system, a video recording server saves an image captured by a camera, and an analysis server receives the image from the camera or the video recording server and performs an image analysis/recognition process on the image. Then, the monitoring camera system displays on a viewing terminal the processing result of the analysis server in a superimposed manner on the processing target image.

A device included in such a monitoring camera system may have an on-screen display (OSD) function for superimposing text information such as a clock time and a camera name and image information such as a logo on an image. In this case, when a viewer confirms on a viewing terminal an image subjected to an image analysis process by the monitoring camera system, the viewer views an image in which the image processing result and additional information such as a clock time and a camera name are superimposed on a captured image. An OSD in this case refers to the display of image information additionally superimposed on the captured image and also includes the display of the result of the image analysis process in addition to the display of the clock time and the camera name.

The publication of Japanese Patent Application Laid-Open No. 2007-199311 discusses a technique for, when OSD information is displayed, recognizing the face of a person from a displayed image and detecting a face display area. In this technique, if the face display area and the display position of the OSD information overlap each other, the display position of the OSD information is moved so that the OSD information does not overlap the face display area, thereby preventing the OSD information from making it difficult to view the image.

However, an image recorded in a video recording server may be recorded in the state where OSD information regarding a camera is written over the image. If an analysis server performs image processing using such an image on which OSD information is superimposed, the result of an analysis may be influenced depending on the content of the analysis.

In a case where an image processing function is added to a network camera system already in operation, some OSD may be already superimposed on a display screen. In such a case, it was difficult for a user who makes an image analysis setting to realize that the display of the OSD may have influence on analysis accuracy at the time the user makes the setting.

SUMMARY OF THE DISCLOSURE

According to an aspect of the embodiments, an apparatus includes a first acquisition unit configured to acquire an image, an analysis unit configured to perform an analysis process on the acquired image, a second acquisition unit configured to acquire a parameter for use in the analysis process on the image, a third acquisition unit configured to acquire superimposition information superimposed on the acquired image, an identification unit configured to, based on the acquired parameter, identify superimposition information that influences the analysis process on the image, and a processing unit configured to perform a process regarding drawing of the identified superimposition information.

Further features of the disclosure will become apparent from the following description of exemplary embodiments with reference to the attached drawings.

BRIEF DESCRIPTION OF THE DRAWINGS

FIG. 5 is a diagram illustrating an example of an analysis setting table according to the exemplary embodiment.

FIG. 6 is a diagram illustrating an example of a superimposition information management table according to the exemplary embodiment.

FIG. 7 is a diagram illustrating an example of a device management table according to the exemplary embodiment.

FIG. 9 is a diagram illustrating an example of display of a window according to the exemplary embodiment.

FIG. 17 is a diagram illustrating examples of changes in the superimposition information management table according to the exemplary embodiment.

DESCRIPTION OF THE EMBODIMENTS

Exemplary embodiments of the disclosure will be described in detail below with reference to the attached drawings. The following exemplary embodiments do not limit the disclosure, and not all the combinations of the features described in the exemplary embodiments are essential for a method for solving the issues in the disclosure. The configurations of the exemplary embodiments can be appropriately modified or changed depending on the specifications of an apparatus to which the disclosure is applied, or various conditions (the use conditions and the use environment). The technical scope of the disclosure is determined by the appended claims, and is not limited by the following individual exemplary embodiments.

Figure 1:
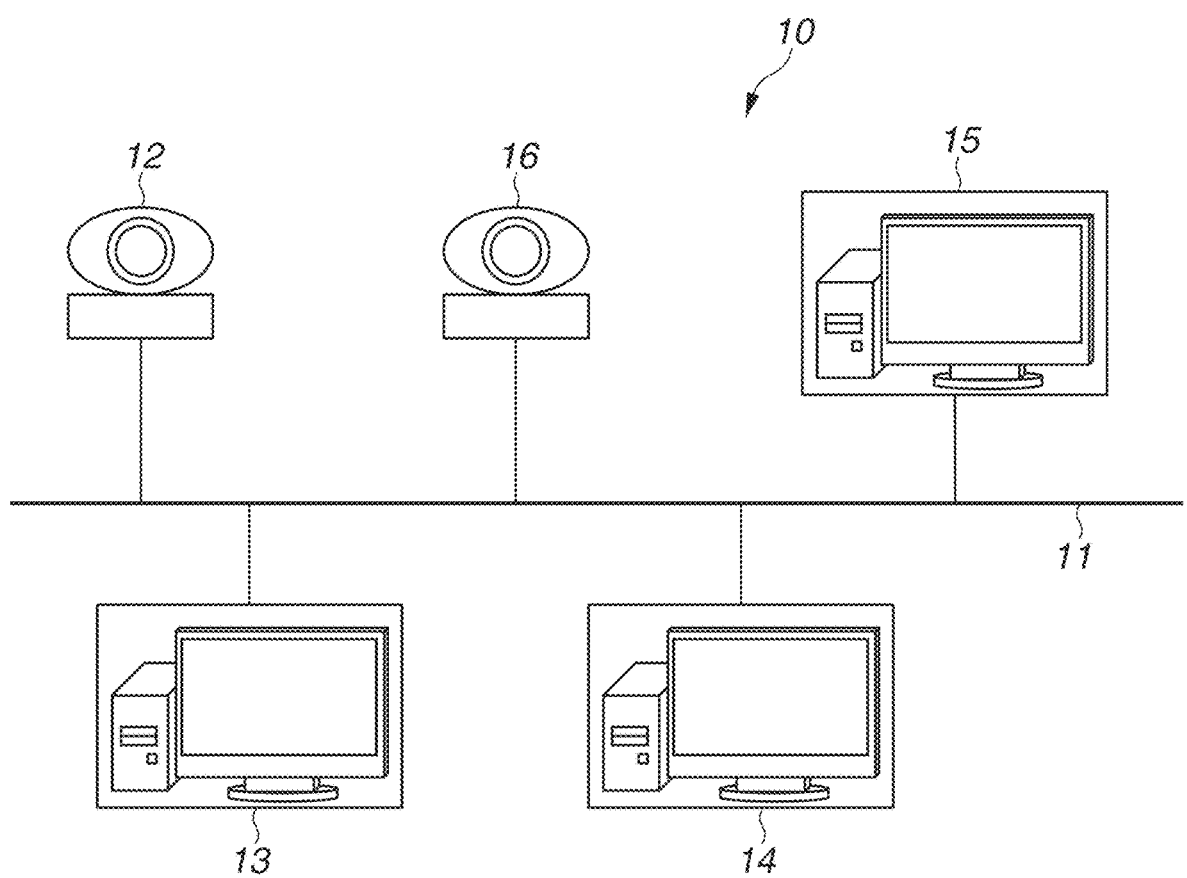
FIG. 1 is a block diagram illustrating an example of a configuration of an image processing system according to an exemplary embodiment.

FIG. 1 is a block diagram illustrating an example of the configuration of an image processing system according to an exemplary embodiment.

In FIG. 1, a network camera system 10 includes at least one network camera 12 or 16, an image recording server 13, an image analysis server 14, and a client personal computer (PC) 15. The network camera 12 or 16, the image recording server 13, the image analysis server 14, and the client PC 15 are connected together via a network 11 and transmit and receive information to and from each other.

The network 11 may be a wired network such as a wired local area network (LAN) compliant with a communication standard such as Ethernet®. Alternatively, the network 11 may be a wireless network. The wireless network may include a wireless personal area network (PAN) based on Bluetooth®, ZigBee®, or ultra-wideband (UWB). Alternatively, the wireless network may include a wireless LAN based on Wireless Fidelity (Wi-Fi®) or a wireless metropolitan area network (MAN) based on WiMAX®. Further, the wireless network may include a wireless wide area network (WAN) based on Long-Term Evolution/third generation (LTE/3G). In the network 11, the wired network and the wireless network may coexist. The network 11 is to enable the connections between the devices so that the devices can communicate with each other. The standard, the scale, and the configuration of the communication are not limited to the above.

The network camera (hereinafter also referred to simply as "camera") 12 or 16 is an imaging apparatus such as a monitoring camera that captures an object at a predetermined angle of view. The camera 12 or 16 can transmit a captured image (hereinafter also referred to simply as "image") to the image recording server 13, the image analysis server 14, and the client PC 15 via the network 11. Although FIG. 1 illustrates the two cameras 12 and 16, the number of cameras included in the network camera system 10 is to be one or more, and is not limited to the illustrated number.

Each of the image recording server 13, the image analysis server 14, and the client PC 15 may be, for example, an information processing apparatus such as a personal computer including a similar hardware configuration. All or some of these information processing apparatuses include an interface that can be operated by a user such as a monitor who monitors a wide area through the network camera system 10.

Although FIG. 1 illustrates the three information processing apparatuses, namely the image recording server 13, the image analysis server 14, and the client PC 15, the number of information processing apparatuses included in the network camera system 10 is not limited to the illustrated number. The functions of the plurality of information processing apparatuses in FIG. 1 may be implemented on a single information processing apparatus, or the functions of the image recording server 13, the image analysis server 14, and the client PC 15 may be implemented on a plurality of information processing apparatuses by appropriately dispersing the functions.

The image recording server 13 receives image data transmitted from the network camera 12 and stores the image data in an internal or external storage device accessible by the image recording server 13.

The image recording server 13 receives various requests and commands transmitted from the image analysis server 14 and the client PC 15 and transmits the image data stored in the storage device to the image analysis server 14 and the client PC 15 having made the requests.

The image analysis server 14 executes an analysis process on the image received from the image recording server 13. For example, the image analysis server 14 analyzes the image received from the image recording server 13, thereby detecting an object. This image analysis process includes at least one of object detection, moving body detection, human body detection, face detection, object tracking, and abnormality detection from the image. The flow of the image analysis process according to the present exemplary embodiment will be described below with reference to FIGS. 18 and 19.

The processing result of the image analysis process includes information regarding the result of detecting an object and is stored in an internal or external storage device accessible by the image analysis server 14. In response to a request from the client PC 15, the image analysis server 14 appropriately transmits the result of the image analysis stored in the storage device. The image recording server 13 may record and save the image captured by the network camera 12 or 16, and the image analysis server 14 may receive the image data from the image recording server 13, or the image analysis server 14 may directly receive the image data from the camera 12 or 16.

The client PC 15 receives various requests and commands from the user such as the monitor, transmits the various requests and commands to the image analysis server 14, and receives and acquires the result of the image analysis transmitted from the image analysis server 14. The client PC 15 also receives various requests and commands from the user and transmits an image recording control instruction to the image recording server 13. The function of the client PC 15 may be implemented on a portable terminal apparatus such as a tablet.

The client PC 15 includes a display device (a display) and has a display control function for displaying, on the display device, the image data transmitted from the camera 12 or 16 and the result of the image analysis performed by the image analysis server 14. The client PC 15 also includes an interface for performing a parameter setting operation regarding the image analysis process executed by the image analysis server 14 and has an input function. The parameter setting operation regarding the image analysis process is, for example, the setting of a monitoring target region and the setting of various thresholds.

Each of the camera 12 or 16, the image recording server 13, the image analysis server 14, and the client PC 15 also has an on-screen display (OSD) function for superimposing superimposition information on the image. The superimposition information is, for example, OSD information superimposed on the image by the OSD function. The OSD information is, for example, text information such as the image capturing time of the image, the image capturing location of the image, and a camera name, and image information such as a logo. The superimposition information also includes information regarding the result of the image analysis process. Further, each of the camera 12, the image recording server 13, the image analysis server 14, and the client PC 15 has the function of outputting OSD setting information regarding the OSD superimposed on the image by the device itself to another device. Further, each of the camera 12, the image recording server 13, the image analysis server 14, and the client PC 15 has the function of enabling an OSD setting to be newly created and changed by inputting OSD setting information from another device.

Based on a parameter for use in the analysis process on the image, the image analysis server 14 identifies superimposition information that influences the analysis of the image. Based on a parameter for use in the analysis process on the image, the image analysis server 14 may identify superimposition information that interferes with the analysis of the image. Then, the image analysis server 14 notifies the client PC 15 of the superimposition information that influences the analysis of the image, or performs a process regarding the superimposition information that influences the analysis of the image. The process regarding the superimposition information that influences the analysis of the image is, for example, the process of changing the display state of the superimposition information identified as influencing the analysis of the image to a display state that does not influence the analysis of the image.

Figure 2:
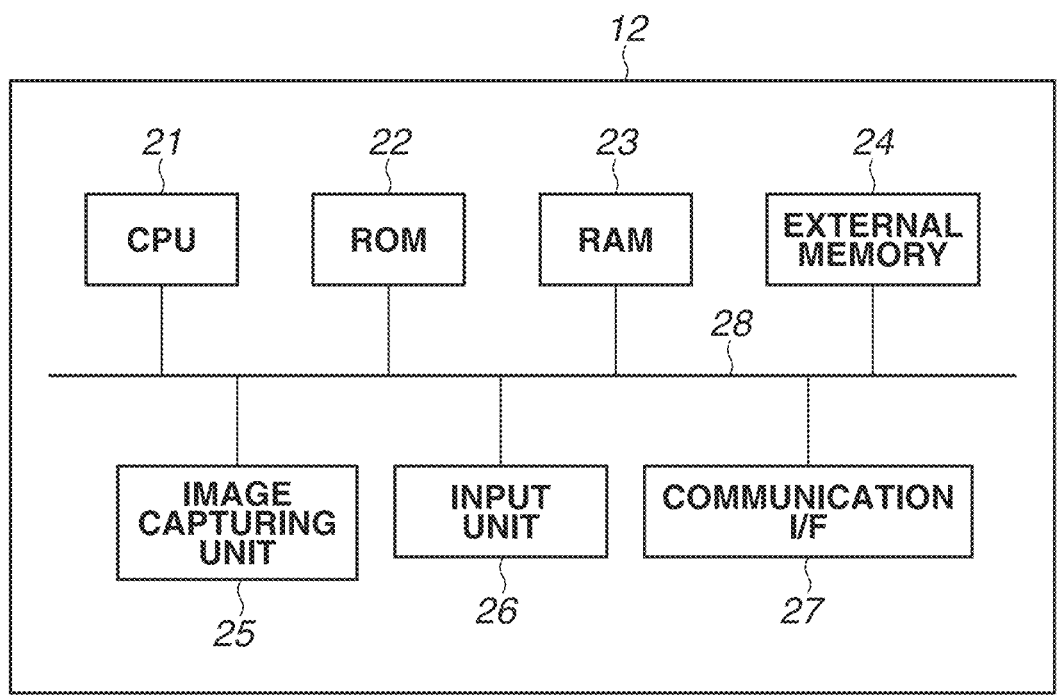
FIG. 2 is a block diagram illustrating an example of a hardware configuration of a network camera in FIG. 1.

FIG. 2 is a block diagram illustrating an example of the hardware configuration of the network camera in FIG. 1.

In FIG. 2, the camera 12 includes a central processing unit (CPU) 21, a read-only memory (ROM) 22, a random-access memory (RAM) 23, and an external memory 24. The camera 12 also includes an image capturing unit 25, an input unit 26, a communication interface (I/F) 27, and a system bus 28.

The CPU 21 performs overall control of the operation of the camera 12. At this time, the CPU 21 controls the ROM 22, the RAM 23, the external memory 24, the image capturing unit 25, the input unit 26, and the communication I/F 27 via the system bus 28.

The ROM 22 is a non-volatile memory that stores a control program for the CPU 21 to perform various processes. The control program may be stored in the external memory 24 or an attachable and detachable storage medium (not illustrated).

The RAM 23 functions as a main memory or a work area for the CPU 21. That is, when performing various processes, the CPU 21 loads a program from the ROM 22 into the RAM 23 and executes the program, thereby achieving various functional operations.

The external memory 24 stores, for example, various pieces of data and various pieces of information that are necessary when the CPU 21 performs processing using a program. The external memory 24 stores, for example, various pieces of data and various pieces of information that are obtained by the CPU 21 performing processing using a program. The external memory 24 is, for example, a hard disk device or a solid-state drive (SSD).

The image capturing unit 25 includes a lens and an image sensor. The lens is an optical lens for forming an image of incident light from a captured object on the image sensor. The lens concentrates the incident light on the image sensor. The image sensor converts the light into an electric signal for each pixel. The image sensor is, for example, a complementary metal-oxide-semiconductor (CMOS) sensor or a charge-coupled device (CCD) sensor.

The input unit 26 includes a power button and an operation button. The user of the camera 12 can give an instruction to the camera 12 via the input unit 26.

The communication I/F 27 is an interface for communicating with external apparatuses (e.g., the image recording server 13, the image analysis server 14, and the client PC 15) connected to the network 11, and is, for example, a LAN interface.

The system bus 28 connects the CPU 21, the ROM 22, the RAM 23, the external memory 24, the image capturing unit 25, the input unit 26, and the communication I/F 27 so that these components can communicate with each other.

The functions of the components of the camera 12 illustrated in FIG. 2 can be achieved by the CPU 21 executing a program stored in the ROM 22 or the external memory 24.

In the hardware configuration in FIG. 2, each of the image recording server 13, the image analysis server 14, and the client PC 15 may include hardware such as a display device instead of the image capturing unit 25. The display device may be a monitor such as a liquid crystal display (LCD). Each of the image recording server 13, the image analysis server 14, and the client PC 15 may include a pointing device such as a keyboard and a mouse as the input unit 26. The user can give an instruction to each of the image recording server 13, the image analysis server 14, and the client PC 15 through the input unit 26.

Figure 3:
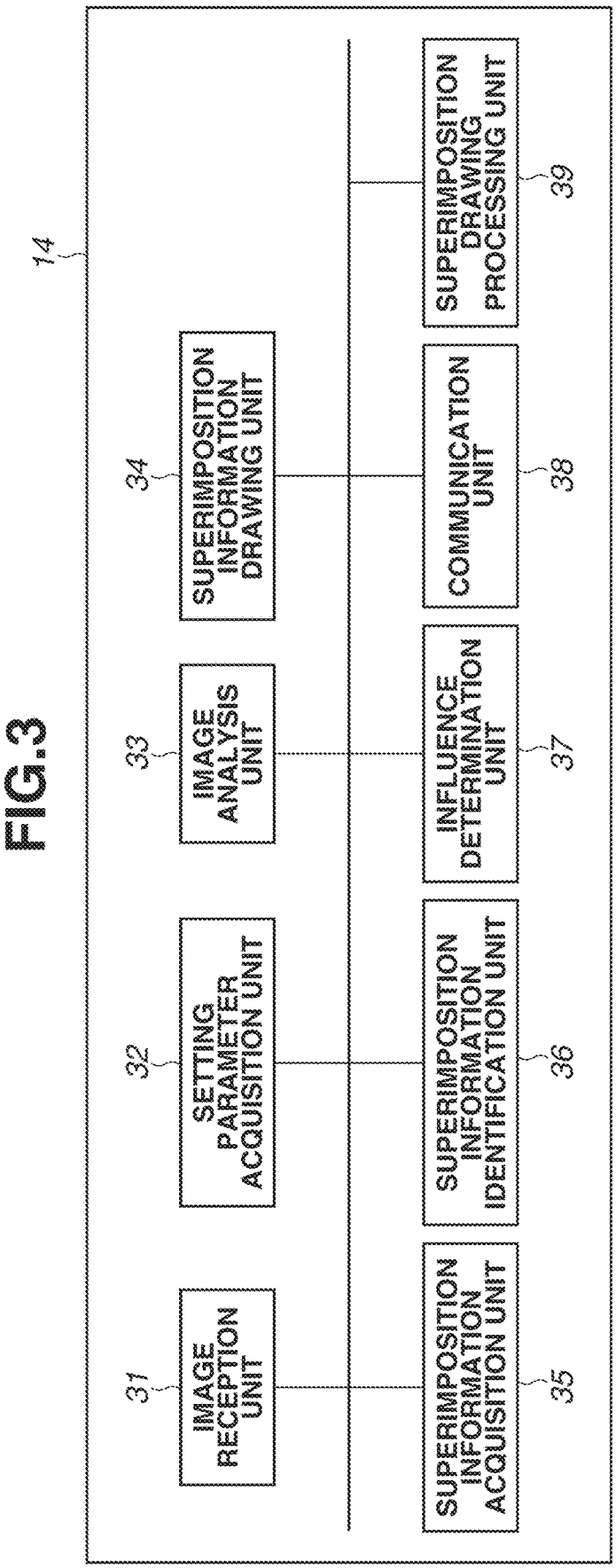
FIG. 3 is a block diagram illustrating an example of a functional configuration of an image analysis server in FIG. 1.

FIG. 3 is a block diagram illustrating an example of the functional configuration of the image analysis server in FIG. 1.

In a case where functions are achieved by software among the functions of functional modules of the image analysis server 14 illustrated in FIG. 3, a program for providing the functions of the functional modules is stored in a memory such as the ROM 22. Then, the program is loaded into the RAM 23 and executed by the CPU 21. In a case where functions are achieved by hardware, for example, a dedicated circuit may be automatically generated on a field-programmable gate array (FPGA) using a predetermined compiler according to the program for achieving the functions of the functional modules. Alternatively, a gate array circuit may be formed similarly to the FPGA, and the functions may be achieved as hardware. Yet alternatively, the functions may be achieved by an application-specific integrated circuit (ASIC). The configurations of functional blocks illustrated in FIG. 3 are merely examples. Alternatively, a plurality of functional blocks may be included in a single functional block, or any of the functional blocks may be divided into blocks for performing a plurality of functions. All or some of the functional blocks illustrated in FIG. 3 may be provided in the network camera 12 instead of the image analysis server 14, or may be provided in a general-purpose information processing apparatus (PC) including the image recording server 13, or may be provided in the client PC 15.

In FIG. 3, the image analysis server 14 includes an image reception unit 31, a setting parameter acquisition unit 32, an image analysis unit 33, a superimposition information drawing unit 34, a superimposition information acquisition unit 35, a superimposition information identification unit 36, an influence determination unit 37, a communication unit 38, and a superimposition drawing processing unit 39.

The image analysis server 14 can detect a person from an image and also detect a person from a video. To detect a person from a video, the image analysis server 14 may acquire a video from the network camera 12 and execute a process similar to an image analysis process on an image with respect to each frame of the video (a moving image).

The image reception unit 31 receives image data captured by the camera 12 or 16 via the image recording server 13 and decompresses and decodes the received image data, thereby acquiring the image. The image to be acquired may be a moving image, or may be a still image. The image reception unit 31 sequentially transmits the acquired image to the image analysis unit 33.

A supply source that supplies an image to the image reception unit 31 is not particularly limited, and may be, instead of the camera 12 or 16 and the image recording server 13, a server apparatus or a recorded video management apparatus capable of supplying an image via wired or wireless communication, or may be an imaging apparatus other than the camera 12 or 16. Alternatively, the image reception unit 31 may acquire an image from a memory such as the external memory 24 of the image analysis server 14.

A description will be given below taking as an example a case where the image reception unit 31 transmits a single image to the image analysis unit 33 in a case where the image reception unit 31 acquires a moving image or a still image. In a case where the image reception unit 31 acquires the moving image, the single image corresponds to each frame included in the moving image. In a case where the image reception unit 31 acquires the still image, the single image corresponds to the still image.

The setting parameter acquisition unit 32 acquires a parameter for use when the image analysis unit 33 performs an analysis process on the image. Examples of the parameter include parameters such as various thresholds, a region indicating a detection range in a screen, a target camera, and a detection target when the image analysis unit 33 performs the analysis process on the image. The parameter is held in a storage device in the image analysis server 14 or a database (not illustrated) accessible via the network 11.

The parameter for use in the analysis process on the image can be changed depending on the type of the parameter. To newly create an analysis rule or change the parameter, the parameter set using the client PC 15 is transmitted to the image analysis server 14, received by the communication unit 38, and acquired by the setting parameter acquisition unit 32. The parameter can be changed using the client PC 15 at any timing in a case where an analysis rule is newly created or a set analysis content is changed when the image analysis is newly started.

Based on a parameter for an analysis setting acquired from an analysis setting table 50 in FIG. 5 by the setting parameter acquisition unit 32, the image analysis unit 33 performs the image analysis process on the image acquired by the image reception unit 31. For example, according to an analysis setting made in the analysis setting table 50, the image analysis unit 33 performs the analysis process such as moving body detection, human body detection, face authentication, and the tracking of a detected detection target. FIG. 5 is a diagram illustrating an example of the analysis setting table according to the exemplary embodiment.

In FIG. 5, the analysis setting table 50 defines parameter information regarding the settings of the image analysis executed by the image analysis server 14. The parameter information defined in the analysis setting table 50 is input by an operator via an input device of the client PC 15 or the image analysis server 14 in advance or when a change is made. The analysis setting table 50 includes "Camera ID", "Type", "Source ID", "Area", "Margin", "Attribute", and "Action" fields.

"ID" indicates an identifier for uniquely identifying the parameter information regarding the analysis settings. "Type" indicates the type of the image analysis. The image analysis unit 33 performs the image analysis process such as moving body detection, human body detection, and prank detection according to "Type". "Source ID" indicates the ID of a device which is a supply source that supplies the image as the image analysis target. As "Source ID", the same identification information as the ID of a device managed by a device management table 70 in FIG. 7 is used.

"Area" indicates the processing range in the image of the image analysis process and is represented by a rectangle indicated by upper left coordinates and lower right coordinates. If the "Area" field is "all", this indicates that the processing range is the entire region of the target image. In the example of FIG. 5, the region information indicated by "Area" is a rectangle, but may be in any format so long as the region information represents a region in the screen. For example, the region information may be a polygon represented by a polygon of a point sequence, or may be represented by vector information or three-dimensional closed space information.

"Margin" is a parameter for use in an influence determination process performed by the influence determination unit 37. "Margin" is used to make an overlap determination between OSD information defined by a superimposition information management table 60 in FIG. 6 and the image analysis range. "Attribute" indicates an object which is a detection target in the analysis settings. For example, in the image analysis, if "Attribute" is a human body, this indicates a detection process on a human body as a target. If "Attribute" is a moving body, this indicates a detection process on a moving body as a target. "Attribute" may be not only a human body or a moving body, but also any target such as a face, a vehicle, or an animal so long as the detection target can be detected by the image analysis unit 33. "Action" indicates an operation to be conducted when a target is detected in the image analysis. For example, if "Action" is a notification, this indicates that if a target is detected, a notification (screen display) process is performed.

For example, if "Type" in the analysis setting table 50 is intrusion detection, and "Attribute" is a human body, the image analysis unit 33 in FIG. 3 detects a human body from the image. Then, the image analysis unit 33 tracks the human body and detects that the human body intrudes into the detection target area set in "Area".

At this time, the image analysis unit 33 can detect, from the image acquired by the image reception unit 31, a human body using a collation pattern dictionary stored in advance. In this case, the image analysis unit 33 is to have the function of detecting a human body from an image. The human body detection process is not limited to a pattern collation process, and may be a human body detection process using a feature amount based on a luminance gradient.

The image analysis unit 33 assigns human body tracking ID (identification information regarding an object) unique to a human body identified based on the positional relationships between frames and thereby can perform a tracking process on the human body (the object). In the tracking process, as a method for determining that the same object is detected over a plurality of frames, there is a method for, if the movement prediction position of a detected object and the detected position of the object are within a certain distance from each other using a movement vector of the detected object, determining that the same object is detected. There is also a method for associating objects highly correlated to each other between frames, using the colors, the shapes, and the sizes (the areas) of objects. In the tracking process, the process of determining that the same object is detected over a plurality of frames, and tracking the object is performed. The method for this process, however, is not limited to a particular method, and any method for performing a similar process is applicable as appropriate.

Then, the image analysis unit 33 references the region where the human body is detected by the tracking process and the information regarding "Area" in the analysis setting table 50. When a human body region passes through or enters the target "Area", the image analysis unit 33 detects the passage or the intrusion of the human body. The result of the detection process performed by the image analysis unit 33 is written to the superimposition information management table 60 in FIG. 6 as needed and is drawn in a superimposed manner on the image by the superimposition information drawing unit 34 performing a drawing process for drawing superimposition information.

FIG. 6 is a diagram illustrating an example of the superimposition information management table according to the exemplary embodiment.

In FIG. 6, the superimposition information management table 60 manages superimposition information to be superimposed on the image. The superimposition information management table 60 includes "ID", "Source ID", "Type", "Position", "TextString", "Font", "Color", and "BackgroundColor" fields.

"ID" is an identifier for uniquely identifying the superimposition information. "Source ID" is the identifier of a device that assigns the superimposition information. "Type" is the type of the superimposition information. The type of the superimposition information indicates the type of data of information to be superimposed and holds the value of any of "text" (Text), "image" (Image), and "other" (Extended). "Position" is the position in the screen of the superimposition information. The position in the screen of the superimposition information is the region in the screen where the superimposition information is drawn, and is represented by a rectangle including upper left coordinates and lower right coordinates in this case. "TextString" is the content of the superimposition information. The content of the superimposition information indicates the character string of the drawing content and indicates that the superimposition information is drawn on the screen with the contents of the "Font" and "BackgroundColor" fields. "Font" is the font of the character to be superimposed. "Color" is the color of the character to be superimposed. "BackgroundColor" is the background color of the region of the superimposition information. In the "BackgroundColor" field, transparency can be set. If the transparency is set to 100%, the character is drawn in a superimposed manner on the screen such that the background is transparent.

The superimposition information drawing unit 34 performs the process of drawing the detection result of the image analysis unit 33 and the OSD information set for the analysis server 14 in the superimposition information management table 60 in a superimposed manner on the image received by the image reception unit 31. The communication unit 38 transmits to the client PC 15 the image on which the OSD information is written by the superimposition information drawing unit 34.

The superimposition information acquisition unit 35 acquires pieces of OSD information from all the devices, including OSD information assigned by another device and to be superimposed on a processing result image to be ultimately displayed on the client PC 15. The information acquired by the superimposition information acquisition unit 35 is managed by the superimposition information management table 60 in FIG. 6.

The superimposition information management table 60 manages the output of OSD setting information from each device to another device and the input of OSD setting information from another device in the network camera system 10. Thus, when the superimposition information acquisition unit 35 requests OSD setting information from another device, superimposition information management table 60 is created or changed as needed.

The timing at which the superimposition information acquisition unit 35 requests OSD setting information from another device may be when a setter of the client PC 15 newly creates or changes an analysis setting, or may be when the image analysis server 14 starts.

The superimposition information identification unit 36 references the superimposition information management table 60, and among the pieces of superimposition information acquired by the superimposition information acquisition unit 35, identifies superimposition information presumed to have a possibility of influencing the analysis process result of the image analysis unit 33. Based on the identifiers ("Source ID") of the devices that has assigned the pieces of superimposition information, the superimposition information identification unit 36 primarily determines superimposition information presumed to have a possibility of influencing the analysis process result of the image analysis unit 33. At this time, the superimposition information identification unit 36 determines that an OSD already drawn on an analysis process target image is an OSD having a possibility of influencing the analysis process result of the image analysis unit 33. The superimposition information identification unit 36 determines that an OSD to be drawn on the analysis process target image after the analysis process is an OSD that does not influence the analysis process result of the image analysis unit 33.

The influence determination unit 37 references the analysis setting table 50 and secondarily determines whether the OSD identified by the superimposition information identification unit 36 has influence on the analysis of the image. At this time, the influence determination unit 37 can determine that an OSD that interferes with the analysis of the image is an OSD that influences the analysis of the image. For example, the influence determination unit 37 makes this influence determination using "Area" and "Margin" in the analysis setting parameters managed by the setting parameter acquisition unit 32 and the region of the OSD identified by the superimposition information identification unit 36. That is, the influence determination unit 37 references the drawing region ("Position") of the OSD and the detection target region ("Area") in the analysis settings to be made. If the regions overlap each other, the influence determination unit 37 determines that the OSD influences the target detection process. The influence determination is made using, as the detection target region ("Area") on which the overlap determination is made, a region obtained by expanding a range corresponding to the pixel value of "Margin". This expansion can be set to any value by assuming the object tracking accuracy of a fast-moving object and a detection error in the position of a detected object.

The communication unit 38 transmits to the client PC 15 the image on which the OSD information is written by the superimposition information drawing unit 34 and the determination result of the influence determination unit 37. The communication unit 38 receives from the client PC 15 an instruction in response to the determination result of the influence determination unit 37.

The superimposition drawing processing unit 39 performs a process regarding the drawing of the OSD information determined by the influence determination unit 37. For example, the superimposition drawing processing unit 39 changes the display state of the OSD information identified as influencing the analysis process on the image to a display state that does not influence the analysis process on the image. At this time, the superimposition drawing processing unit 39 may delete the superimposition information identified as influencing the analysis process on the image, or may change the display position of the superimposition information identified as influencing the analysis process on the image to a position that does not influence the analysis process on the image. Alternatively, the superimposition drawing processing unit 39 may instruct a first device (e.g., the camera 12 or 16 and the image recording server 13) having performed a superimposition process for superimposing the superimposition information identified as influencing the analysis process on the image not to perform the superimposition process for superimposing the OSD information. Yet alternatively, the superimposition drawing processing unit 39 may instruct a second device (e.g., the client PC 15) that does not influence the analysis process on the image, to perform a superimposition process for superimposing information having the same content as the superimposition information subjected to the superimposition process by the first device.

Figure 4:
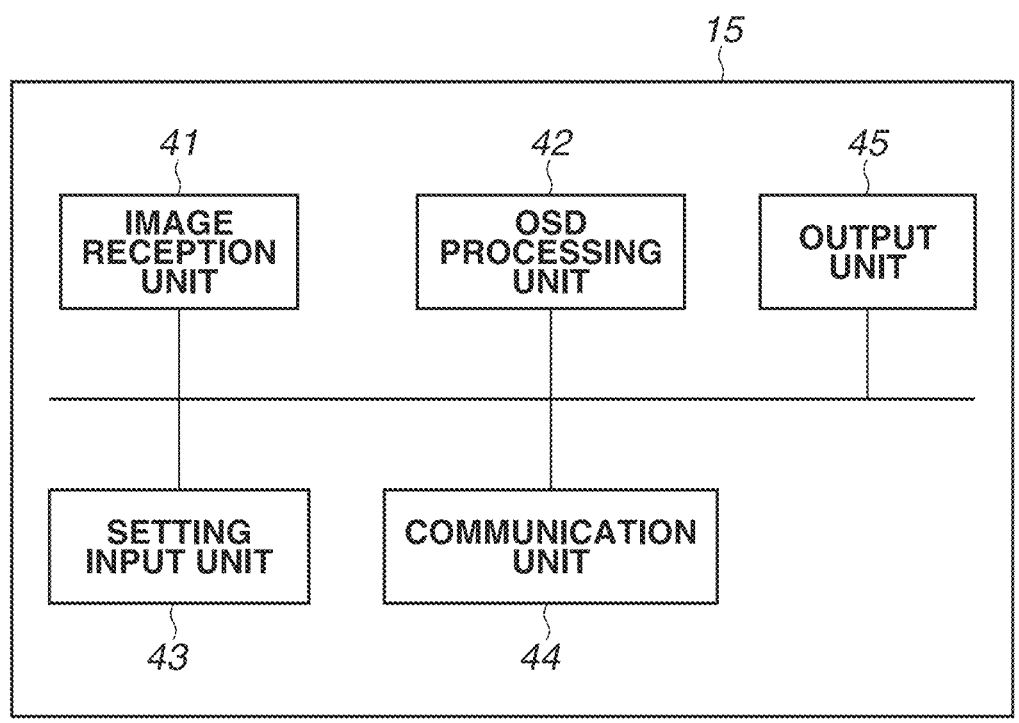
FIG. 4 is a block diagram illustrating an example of a functional configuration of a client personal computer (PC) in FIG. 1.

FIG. 4 is a block diagram illustrating an example of the functional configuration of the client PC in FIG. 1.

In FIG. 4, the client PC 15 includes an image reception unit 41, an OSD processing unit 42, a setting input unit 43, a communication unit 44, and an output unit 45.

The image reception unit 41 receives, from the image analysis server 14 via the network 11, an image on which OSD information is written according to the settings in the superimposition information management table 60.

Based on OSD setting information of the client PC 15, the OSD processing unit 42 writes OSD information on the image received by the image reception unit 41. Based on an OSD information acquisition request from another device, the OSD processing unit 42 transmits the OSD information set in the client PC 15 via the communication unit 44. The OSD processing unit 42 receives an OSD information change request from another device via the communication unit 44 and changes the OSD information set in the client PC 15 based on the received settings.

The setting input unit 43 inputs the settings of the network camera system 10 including the parameters regarding the analysis setting table 50 and the device management table 70. The setting input unit 43 includes an interface for performing various setting operations regarding the network camera system 10.

The communication unit 44 communicates with each device connected to the network camera system 10 via the network 11.

The output unit 45 displays an image received by the communication unit 44, OSD information, notification information regarding a detection result, and a setting screen. The output unit 45 may be a display device such as a display, or may be a touch panel obtained by combining a position input device with a display device.

FIG. 7 is a diagram illustrating an example of the device management table according to the exemplary embodiment.

In FIG. 7, the device management table 70 illustrates the configuration of a device connected to the network camera system 10. The device management table 70 is created by the user performing registration work using the input unit 26 of the client PC 15 in advance before an image analysis process is performed. The device management table 70 can be held in the RAM 23 of the client PC 15.

The device management table 70 includes "ID", IP, "Port", "Name", "Sequence", and "Analysis" fields. "ID" is an identifier for uniquely identifying the device. For example, ID "1" can indicate the camera 12, ID "2" can indicate the image recording server 13, ID "3" can indicate the image analysis server 14, and ID "4" can indicate the client PC 15. "IP" is the network address of the device. "Port" is the port number of the device. "Name" is a name representing the device. "Sequence" is image processing order. The image processing order is indicated by sequential numbers assigned in the order of transmission of an image such that a device that captures the image is 0. "Analysis" is an analysis presence/absence flag. If the analysis presence/absence flag is 1, this indicates a device that performs the analysis process.

The image analysis server 14 references the image processing order and the analysis presence/absence flag in the device management table 70 and thereby can distinguish a device that can assign an OSD to an image before an image analysis process. Then, the image analysis server 14 references the superimposition information management table 60 and specifies an OSD assigned by the device that can assign the OSD to the image before the image analysis process, and thereby can primarily determine an OSD having a possibility of influencing the analysis process result.

Figure 8A:
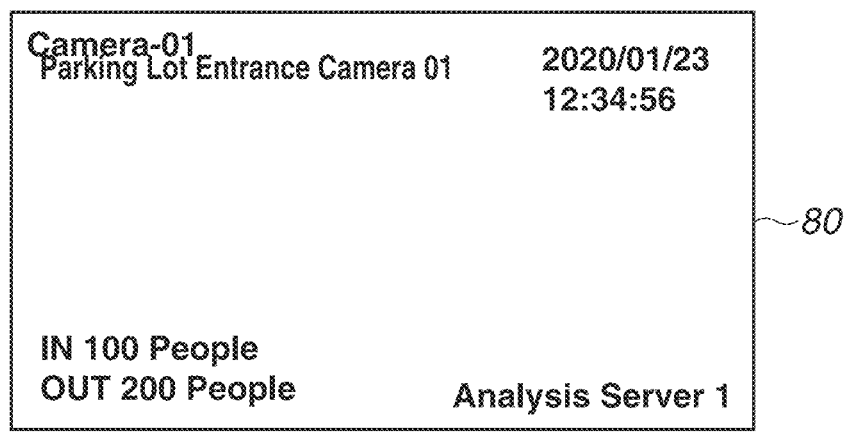
FIGS. 8A and 8B are diagrams illustrating examples of display of a screen according to the exemplary embodiment.
Figure 8B:
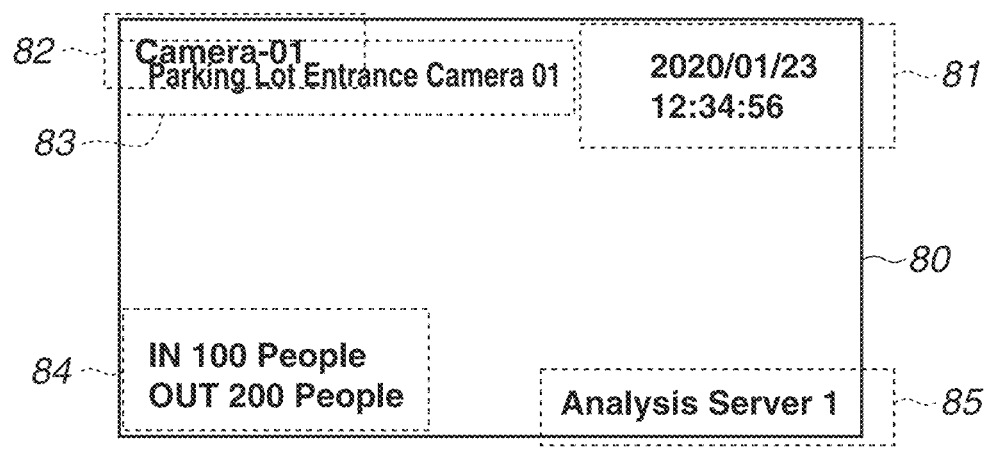

FIGS. 8A and 8B are diagrams illustrating examples of the display of a screen according to the exemplary embodiment. FIG. 8A illustrates an example of the display of a screen in a case where the client PC 15 applies the superimposition information management table 60. FIG. 8B indicates by which device each of five pieces of OSD information on a screen 80 in FIG. 8A is subjected to a superimposition process.

In FIG. 8A, the output unit 45 of the client PC 15 displays a screen 80. The screen 80 displays five pieces of OSD information managed by the superimposition information management table 60. As the five pieces of OSD information, the content indicated by "TextString" is displayed at the position indicated by "Position" for "ID" of each piece of OSD information.

In FIG. 8B, pieces of OSD information 81 to 85 displayed on the screen 80 correspond to records 61 to 65, respectively, in the superimposition information management table 60. The superimposition information identification unit 36 references the superimposition information management table 60 and thereby can distinguish by which device each of the pieces of OSD information 81 to 85 is superimposed. For example, since "Source ID" of the record 61 is "1", it can be determined that the OSD information 81 is drawn on the image by the camera 12.

The superimposition information identification unit 36 references the superimposition information management table 60 and the device management table 70, thereby identifying, among the pieces of OSD information 81 to 85, a record in which the device ID of a device yet to be subjected to the image analysis process is set in "Source ID" in the superimposition information management table 60. In the device management table 70, the devices with ID "1" and ID "2" can assign OSD information to the image before the device with ID "3" that performs the analysis process. Since "Source ID" of these devices is "1" and "2" in the superimposition information management table 60, this corresponds to the records 61 to 63. Thus, the superimposition information identification unit 36 primarily determines that the pieces of OSD information 81 to 83 in FIG. 8B are pieces of OSD information having a possibility of influencing the analysis process result of the image analysis unit 33.

For example, suppose that an analysis setting to be made is intrusion detection (ID "3" in the analysis setting table 50), and the region of "Area" plus "Margin" of the intrusion detection overlaps the drawing regions of the OSDs 82 and 83. In this case, the influence determination unit 37 secondarily determines that, among the pieces of OSD information 81 to 83 primarily determined as having a possibility of influencing the analysis process result, the OSDs 82 and 83 that overlap the intrusion detection region are pieces of OSD information having a possibility of influencing the analysis process result of the image analysis unit 33.

If the pieces of OSD information 82 and 83 having a possibility of influencing the analysis process result of the image analysis unit 33 are determined, the communication unit 38 gives a notification regarding the pieces of OSD information 82 and 83 to the client PC 15. The client PC 15 can display in a window a message regarding the pieces of OSD information 82 and 83 having a possibility of influencing the analysis process result of the image analysis unit 33.

FIG. 9 is a diagram illustrating an example of the display of a window according to the exemplary embodiment.

In FIG. 9, based on a notification regarding an OSD having a possibility of influencing the analysis process result of the image analysis unit 33, the client PC 15 can display a window 90. The display of the window 90 notifies the user that an image analysis setting that the user is trying to make may be influenced by the display of an existing OSD. Consequently, before an image analysis setting is made, the client PC 15 can indicate to the user that an OSD that influences the image analysis setting is displayed, thereby prompting the user to change the display of the OSD.

Figure 10:
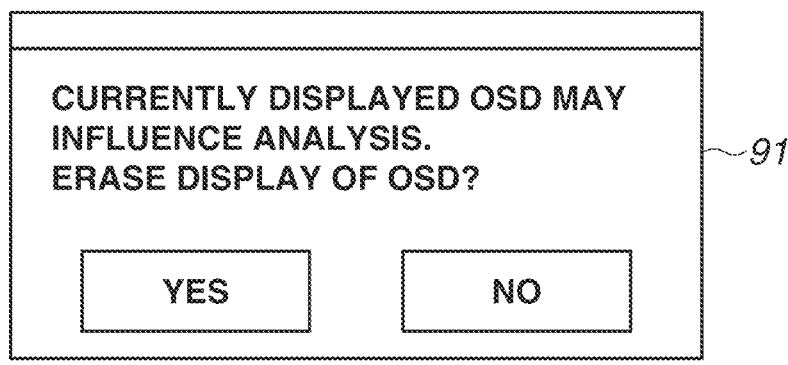
FIG. 10 is a diagram illustrating another example of the display of the window according to the exemplary embodiment.

FIG. 10 is a diagram illustrating another example of the display of the window according to the exemplary embodiment.

In FIG. 10, based on a notification regarding an OSD having a possibility of influencing the analysis process result of the image analysis unit 33, the client PC 15 can display a window 91. The display of the window 91 may be performed instead of the display of the window 90 in FIG. 9, or may be performed after the display of the window 90 in FIG. 9. The display of the window 91 notifies the user that an image analysis setting that the user is trying to make may be influenced by the display of an existing OSD, thereby allowing the user to choose not to display the OSD that influences the image analysis setting. Consequently, before an image analysis setting is made, the client PC 15 can indicate to the user that an OSD that influences the image analysis setting exists, thereby allowing the user to make a change to delete the display of the OSD that influences the image analysis setting based on an instruction from the user.

Figure 11:
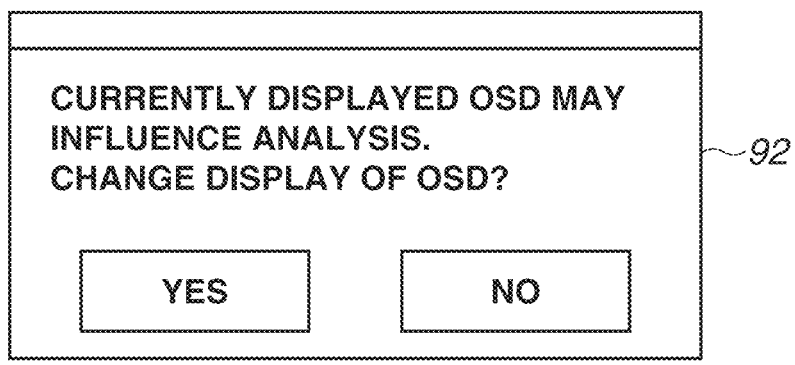
FIG. 11 is a diagram illustrating another example of the display of the window according to the exemplary embodiment.

FIG. 11 is a diagram illustrating another example of the display of the window according to the exemplary embodiment.

In FIG. 11, the client PC 15 can display a window 92 based on a notification regarding an OSD having a possibility of influencing the analysis process result of the image analysis unit 33. The display of the window 92 may be performed instead of the display of the windows 90 and 91 in FIGS. 9 and 10, or may be performed if "No" is selected in the window 91 in FIG. 10. The display of the window 92 notifies the user that an image analysis setting that the user is trying to make may be influenced by the display of an existing OSD, thereby allowing the user to change the display position of the OSD that influences the image analysis setting. Consequently, before an image analysis setting is made, the client PC 15 can indicate to the user that an OSD that influences the image analysis setting exists, thereby allowing the user to change the display position of the OSD based on an instruction from the user.

Figure 12:
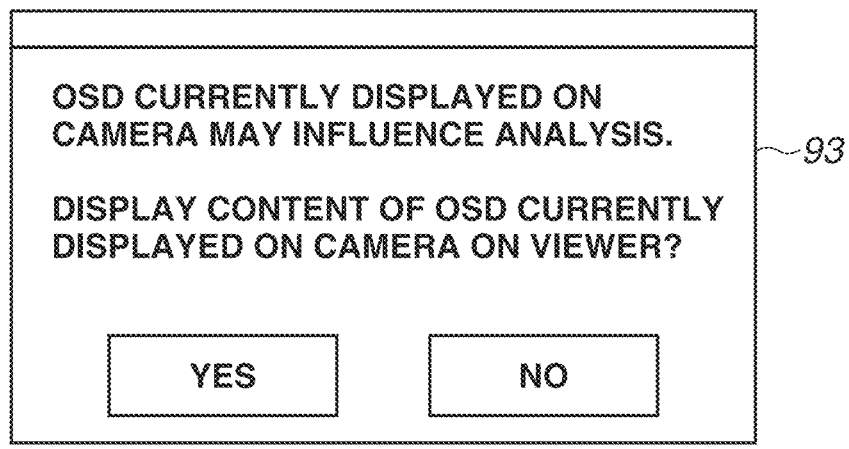
FIG. 12 is a diagram illustrating another example of the display of the window according to the exemplary embodiment.

FIG. 12 is a diagram illustrating another example of the display of the window according to the exemplary embodiment.

In FIG. 12, the client PC 15 can display a window 93 based on a notification regarding an OSD having a possibility of influencing the analysis process result of the image analysis unit 33. The display of the window 93 may be performed instead of the display of the windows 90 to 92 in FIGS. 9 to 11, or may be performed if "No" is selected in the window 92 in FIG. 11. The display of the window 93 notifies the user that an image analysis setting that the user is trying to make may be influenced by the display of an existing OSD, thereby allowing the user to choose to change a display device for displaying the OSD that influences the image analysis setting. Consequently, before an image analysis setting is made, the client PC 15 indicates to the user that an OSD that influences the image analysis setting exists, thereby allowing the user to change a display device for displaying the OSD based on an instruction from the user.

Figure 13:
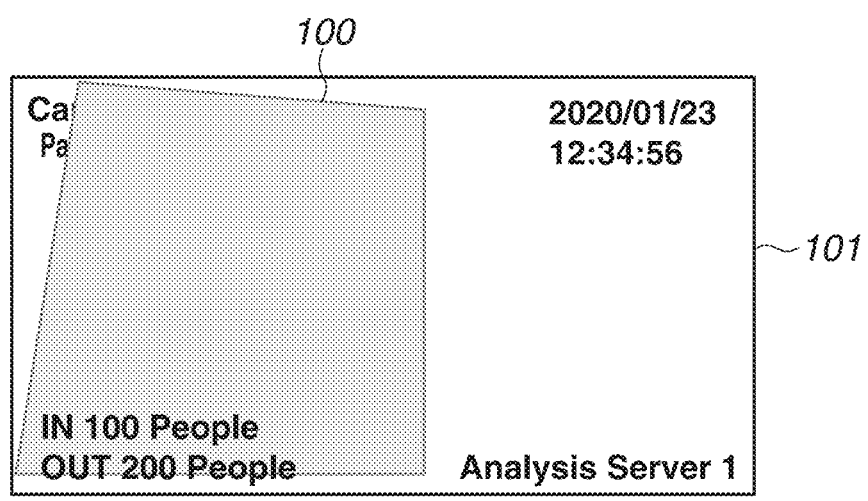
FIG. 13 is a diagram illustrating an example of display of a screen according to the exemplary embodiment.

FIG. 13 is a diagram illustrating an example of the display of a screen according to the exemplary embodiment.

In FIG. 13, the client PC 15 displays a screen 101 before the display of an OSD is changed when analysis settings are changed. On the screen 101, for example, if intrusion detection with ID "3" in the analysis setting table 50 is set, an analysis setting region 100 is displayed. The screen 101 displays the five pieces of OSD information displayed on the screen 80 in FIG. 8A.

Figure 14:
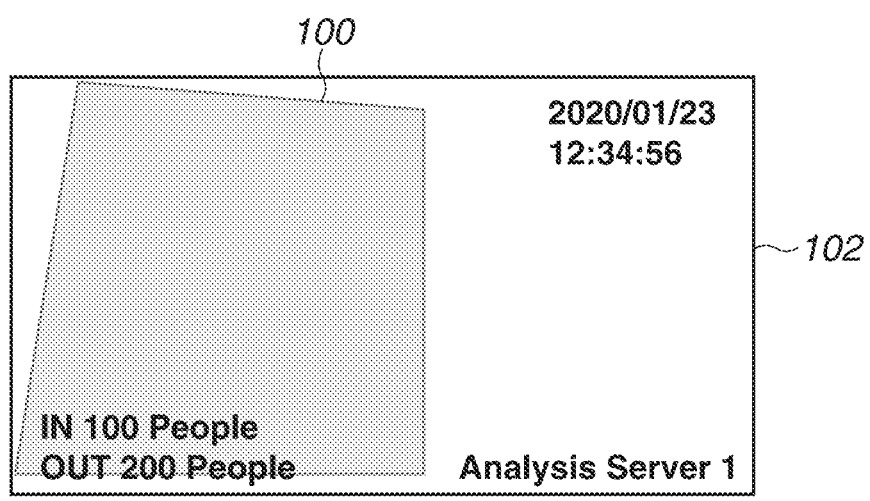
FIG. 14 is a diagram illustrating another example of the display of the screen according to the exemplary embodiment.

FIG. 14 is a diagram illustrating another example of the display of the screen according to the exemplary embodiment.

In FIG. 14, suppose that the user selects "Yes" in the window 91 in FIG. 10. At this time, the client PC 15 displays a screen 102 obtained by applying changes in the display of the OSDs to the screen 101 in FIG. 13. On the screen 102, the display of the OSDs 82 and 83 specified as influencing the analysis process according to the overlap determination made by the influence determination unit 37 is deleted, and the display of the OSD 81 determined as not influencing the analysis process is continued.

As the screen transition to the screen illustrated in FIG. 14, simultaneously with the display of the window 91 in FIG. 10, a preview screen in a different window may be presented in advance to the user, and if "Yes" is selected in the window 91 in FIG. 10, changes in the display of the OSDs on the preview screen may be applied.

Figure 15:
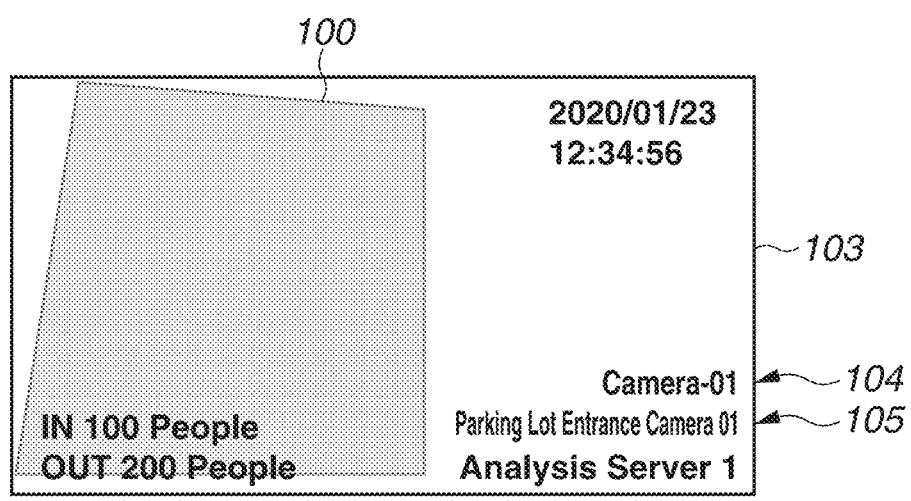
FIG. 15 is a diagram illustrating another example of the display of the screen according to the exemplary embodiment.

FIG. 15 is a diagram illustrating another example of the display of the screen according to the exemplary embodiment.

In FIG. 15, suppose that the user selects "Yes" in the window 92 in FIG. 11. At this time, the client PC 15 displays a screen 103 obtained by applying changes in the display of the OSDs to the screen 101 in FIG. 13. On the screen 103, the display positions of the OSDs 82 and 83 specified as influencing the analysis process according to the overlap determination made by the influence determination unit 37 are moved to positions that do not overlap the analysis setting region 100. Consequently, the image analysis unit 33 can avoid the influence of the superimposition display of the OSDs 82 and 83 on the intrusion detection process.

FIG. 15 illustrates an example where the OSDs 82 and 83 displayed on the screen 101 in FIG. 13 are moved to display positions 104 and 105, respectively, on the screen 103. However, the display may be changed in any manner so long as the display of the OSDs is changed so that the OSDs 82 and 83 do not overlap the analysis setting region 100. For example, the content of the display of the OSDs may be changed, or the font may be reduced. Further, in a case where the positions to which the OSDs are to be moved are determined, history information regarding a moving body detection region in the screen may be separately obtained and the OSDs be moved to positions where viewing is less influenced (the number of moving bodies is smaller).

FIG. 15 illustrates an example where the display positions of the OSDs 82 and 83 are moved to positions that do not overlap the analysis setting region 100. At this time, if there is another detection setting with the same "Source ID" in the superimposition information management table 60, the influence determination unit 37 also determines overlap with the region of this detection setting in the determination of the positions to which the OSDs are to be moved. If there are other detection settings with the same "Source ID", the display setting of the detection setting region or the display settings of the OSDs may be changed so that the detection setting region or the OSDs do not overlap any of the other detection setting regions with the same "Source ID".

On the other hand, suppose that the user selects "Yes" in the window 93 in FIG. 12. As described above, the OSDs that influence the image analysis are OSDs superimposed before the image analysis process. Thus, the image analysis server 14 changes the order of assignment of OSDs (the order of devices that perform a superimposition process) so that contents equivalent to the display contents of the OSDs that influence the image analysis are assigned after the image analysis.

Figure 16:
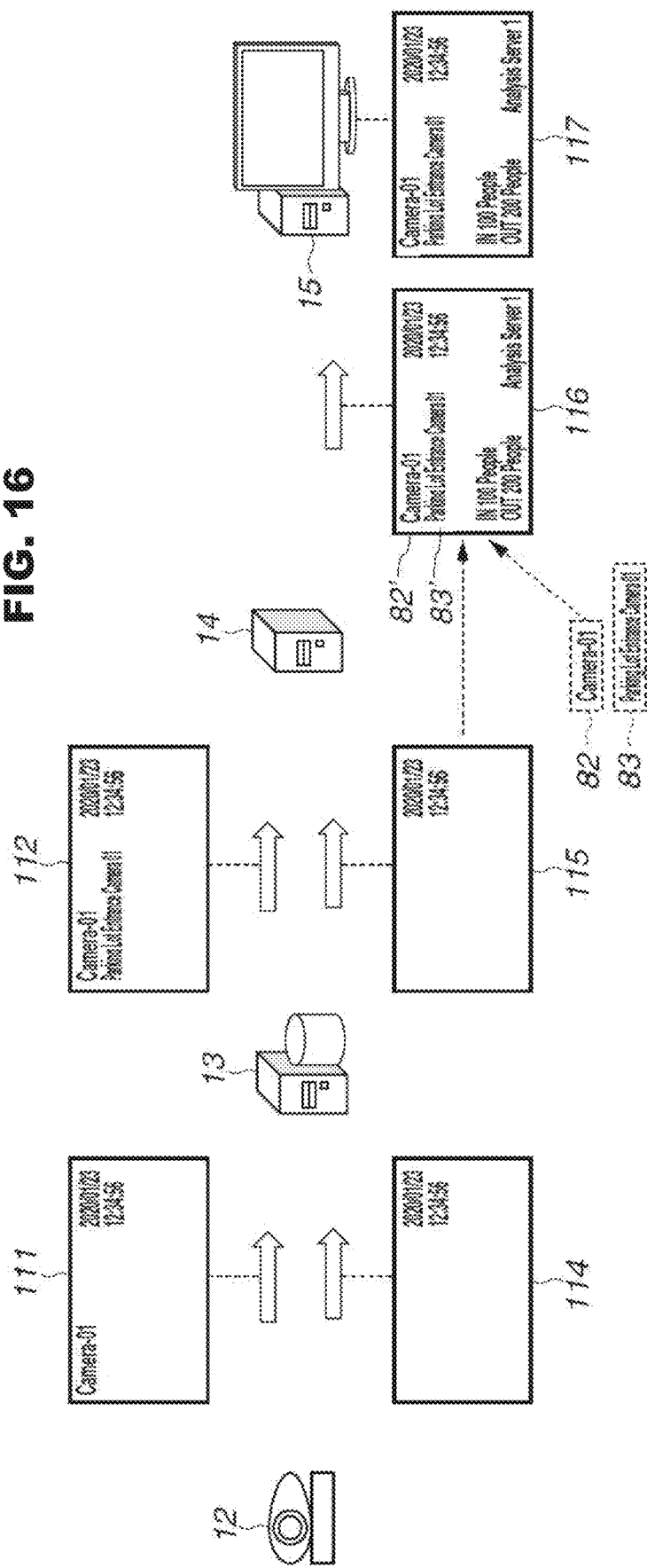
FIG. 16 is a block diagram illustrating a change processing method for changing display of an on-screen display (OSD) according to the exemplary embodiment.

FIG. 16 is a block diagram illustrating a change processing method for changing the display of an OSD according to the exemplary embodiment.

In FIG. 16, for example, the camera 12 superimposes the pieces of OSD information 81 and 82 in FIG. 8B on a captured image and transmits to the image recording server 13 an image 111 in which the pieces of OSD information 81 and 82 are superimposed on the captured image. The image recording server 13 superimposes the OSD information 83 in FIG. 8B on the image 111 and transmits to the image analysis server 14 an image 112 in which the OSD information 83 is superimposed on the image 111.

The image analysis server 14 performs an analysis process on the image 112. Then, the image analysis server 14 secondarily determines that, among the pieces of OSD information 81 to 83 primarily determined as having a possibility of influencing the analysis process result, the pieces of OSD information 82 and 83 overlapping an intrusion detection region are pieces of OSD information having a possibility of influencing the analysis process result. At this time, the image analysis server 14 instructs the camera 12 not to perform the superimposition process for superimposing the OSD information 82. The image analysis server 14 also instructs the image recording server 13 not to perform the superimposition process for superimposing the OSD information 83.

If the camera 12 receives the instruction from the image analysis server 14, the camera 12 superimposes the OSD information 81 on the captured image and transmits to the image recording server 13 an image 114 in which the OSD information 81 is superimposed on the captured image. The image recording server 13 stops the superimposition process for superimposing the OSD information 83 on the image 114 and transmits to the image analysis server 14 an image 115 in which the OSD information 83 is not superimposed on the image 114.

At this time, the image analysis server 14 performs an analysis process on the image 115 in which the pieces of OSD information 82 and 83 having a possibility of influencing the analysis process result are not superimposed. Then, the image analysis server 14 superimposes the OSD information 84 in FIG. 8B on the image 115 and transmits to the client PC 15 an image 116 in which the OSD information 84 is superimposed on the image 115. At this time, the image analysis server 14 instructs the client PC 15 to superimpose pieces of information 82' and 83' having the same contents as the pieces of OSD information 82 and 83 on the image 116.

If the client PC 15 receives the instruction from the image analysis server 14, the client PC 15 causes the OSD processing unit 42 to superimpose the OSD information 85 in FIG. 8B on the image 116 and also superimpose the information 82' and 83' having the same contents as the pieces of OSD information 82 and 83 on the image 116. Then, the client PC 15 displays on the output unit 45 an image 117 in which the OSD information 85 and the pieces of information 82' and 83' having the same contents as the pieces of OSD information 82 and 83 are superimposed on the image 116.

FIG. 17 is a diagram illustrating examples of changes in the superimposition information management table according to the exemplary embodiment.

In FIG. 17, if the user selects "Yes" in the window 93 in FIG. 12, the image analysis server 14 creates a superimposition information management table 60' obtained by changing the contents of the superimposition information management table 60 in FIG. 6. In the change process for changing the display of an OSD in FIG. 16, the image analysis server 14 changes the records 62 and 63 in the superimposition information management table 60 to records 62' and 63', respectively, in the superimposition information management table 60'. In the record 62', "Source ID" of the OSD 82 is changed from "1" to "4". In the record 63', "Source ID" of the OSD 83 is changed from "2" to "4".

At this time, the device that performs the superimposition process for superimposing the OSD information 82 is changed from the camera 12 to the client PC 15. The device that performs the superimposition process for superimposing the OSD information 83 is changed from the image recording server 13 to the client PC 15.

A device that assigns the display of an OSD that influences an image analysis process is thus changed, whereby it is possible to prevent the display of the OSD from influencing the image analysis process and also confirm a content almost equivalent to that before the display of the OSD is changed on a viewing terminal such as the client PC 15.

Figure 18:
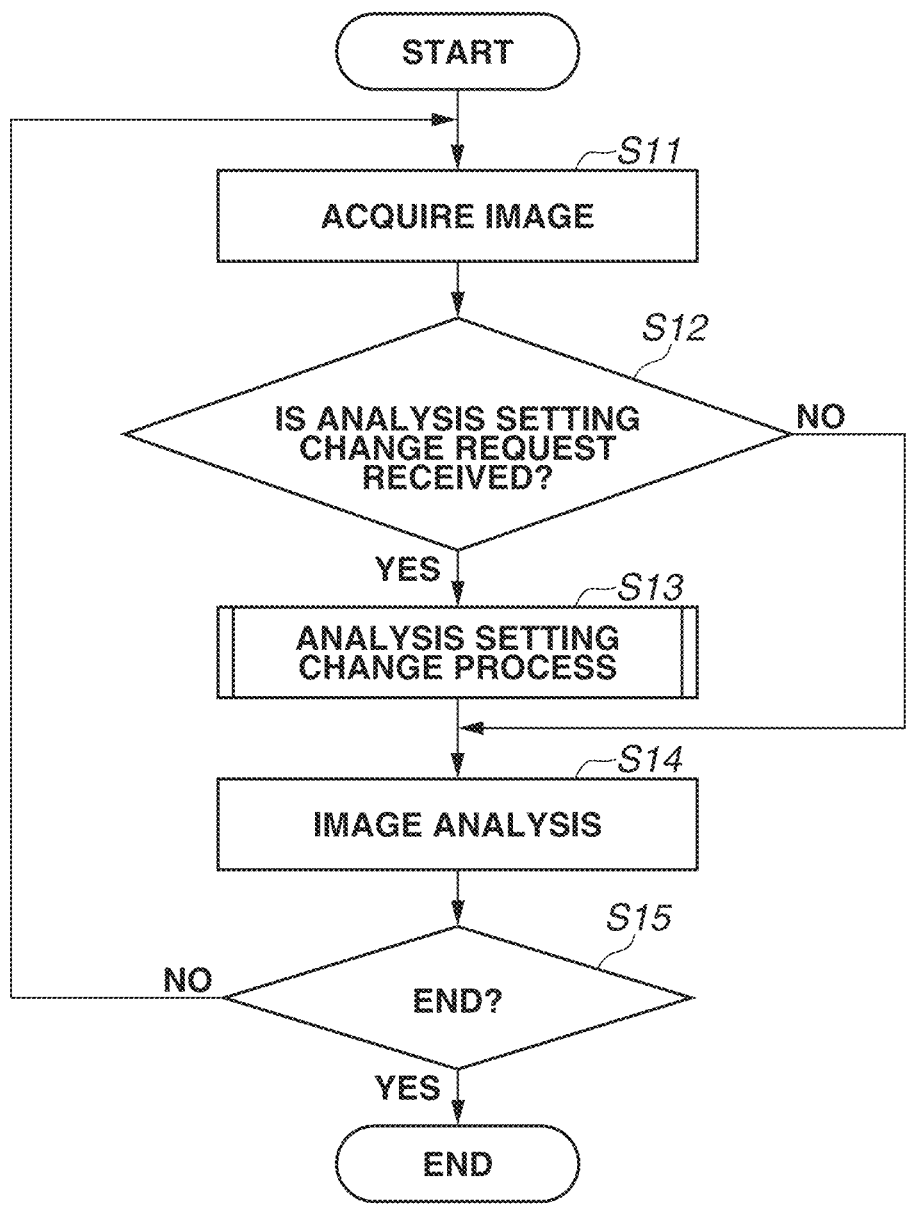
FIG. 18 is a flowchart illustrating an example of an image analysis process performed by the image analysis server in FIG. 3.

FIG. 18 is a flowchart illustrating an example of an image analysis process performed by the image analysis server in FIG. 3.

Steps in FIG. 18 are achieved by the CPU 21 reading and executing a program stored in the ROM 22 or the external memory 24 of the image analysis server 14. Alternatively, at least a part of the flowchart illustrated in FIG. 18 may be achieved by hardware. In a case where at least a part of the flowchart is achieved by hardware, for example, a dedicated circuit may be automatically generated on an FPGA using a predetermined compiler according to the program for achieving the steps. Yet alternatively, a gate array circuit may be formed similarly to the FPGA, and at least a part of the flowchart may be achieved as hardware. Yet alternatively, at least a part of the flowchart may be achieved by an ASIC.

In this case, blocks in the flowchart illustrated in FIG. 18 can be regarded as hardware blocks. Alternatively, a plurality of blocks may be collectively configured as a single hardware block, or a single block may be configured as a plurality of hardware blocks.

In FIG. 18, the image analysis server 14 executes processing according to the reading of a video recorded by a monitoring camera. Alternatively, the image analysis server 14 may execute the processing at regular intervals with respect to each of the cameras 12 and 16. Yet alternatively, the image analysis server 14 may start the processing being triggered by the reception of an image analysis process start request from the client PC 15. However, the timing of the start of the processing illustrated in FIG. 18 is not limited to the above.

In step S11, the image reception unit 31 of the image analysis server 14 receives image data transmitted from the camera 12 via the image recording server 13 and decompresses and decodes the received image data, thereby acquiring the image. The image reception unit 31 supplies the acquired image to the image analysis unit 33 and the superimposition information drawing unit 34.

Next, in step S12, the image analysis server 14 determines whether an analysis setting change request is received from the client PC 15. If the image analysis server 14 determines that the analysis setting change request is received (YES in step S12), the processing proceeds to step S13. If the image analysis server 14 determines that the analysis setting change request is not received (NO in step S12), the processing proceeds to step S14.

In step S13, the image analysis server 14 performs an analysis setting change process. In the analysis setting change process, the image analysis server 14 performs a change process for changing analysis settings and the display of an OSD where necessary. The details of the analysis setting change process will be described below with reference to FIG. 19.

In step S14, based on the setting contents of the analysis setting table 50, the image analysis unit 33 performs an image analysis process on the image received in step S11.

Next, in step S15, the image analysis server 14 determines whether the processing is to be ended. For example, the image analysis server 14 determines whether the processing is to be ended based on whether an instruction to end the processing is received from the user. If the image analysis server 14 determines that the processing is to be ended (YES in step S15), the processing ends. If, on the other hand, the image analysis server 14 determines that the processing is not to be ended (NO in step S15), the processing returns to step S11. The image processing in steps S11 to S14 is repeated until it is determined that the processing is to be ended.

Figure 19:
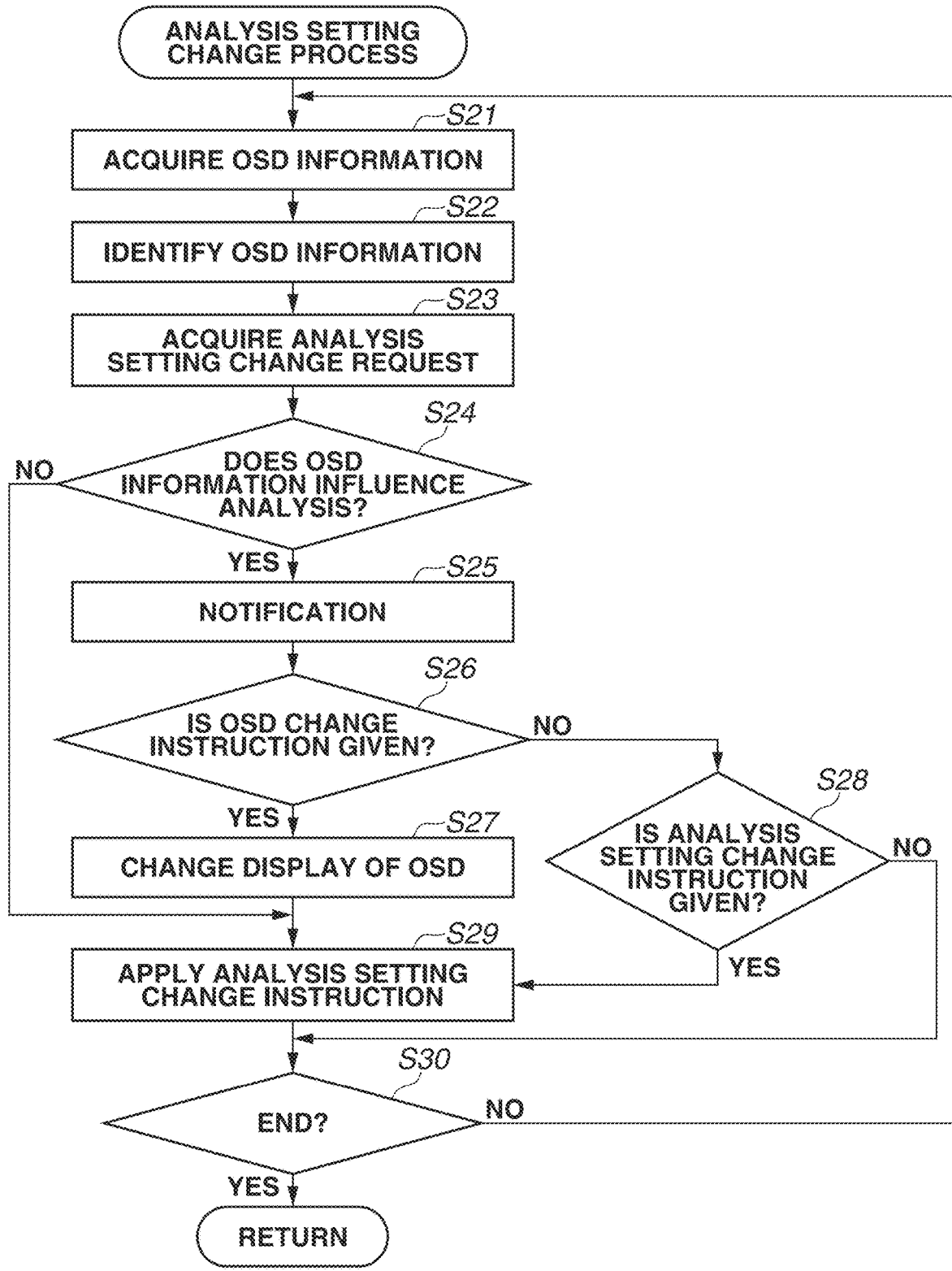
FIG. 19 is a flowchart illustrating an example of an analysis setting change process performed by the image analysis server in FIG. 3.

FIG. 19 is a flowchart illustrating an example of the analysis setting change process performed by the image analysis server in FIG. 3.

In step S21 in FIG. 19, the superimposition information acquisition unit 35 transmits an OSD information acquisition request to the network camera system 10 and capable of performing OSD control. Then, based on pieces of OSD information regarding the devices received in response to the OSD information acquisition request, the superimposition information acquisition unit 35 updates the contents of the superimposition information management table 60.

Next, in step S22, among the pieces of OSD information acquired in step S21, the superimposition information identification unit 36 primarily determines OSD information presumed to have a possibility of influencing the analysis process result of the image analysis unit 33. At this time, based on the device identifiers in the device management table 70 and the superimposition information management table 60, the superimposition information identification unit 36 primarily determines OSD information presumed to have a possibility of influencing the analysis process result of the image analysis unit 33.

The OSD information having a possibility of influencing the analysis process result of the image analysis unit 33 refers to OSD information already drawn on the analysis process target image. For example, in the network camera system 10 in FIG. 1, pieces of OSD information assigned by the camera 12 or 16 and the image recording server 13 correspond to the OSD information having a possibility of influencing the analysis process result of the image analysis unit 33. At this time, the superimposition information identification unit 36 extracts a device the "Sequence" number of which comes before that of a device the "Analysis" flag of which indicates "1" in the device management table 70, thereby identifying OSD information already drawn on the analysis process target image.

Next, in step S23, the setting parameter acquisition unit 32 acquires analysis parameters, which is the analysis setting change request, from the client PC 15.

Next, in step S24, the influence determination unit 37 determines whether the OSD information identified in step S22 influences the image analysis process to be executed by the image analysis unit 33 when the analysis parameters acquired in step S23 are applied.

If the target region in the analysis settings of the analysis parameters acquired in step S23 overlaps a region obtained by adding the margin value to the drawing region of the OSD information identified in step S22, the influence determination unit 37 determines that the OSD information influences the image analysis process. If the influence determination unit 37 determines that the OSD information influences the image analysis process (YES in step S24), the processing proceeds to step S25. If the influence determination unit 37 determines that the OSD information does not influence the image analysis process (NO in step S24), the processing proceeds to step S29.

In step S25, the communication unit 38 transmits to the client PC 15 a notification of the determination result of the influence determination unit 37 that the OSD information influences the image analysis process. The client PC 15 displays the notification received from the image analysis server 14 on the display device of the client PC 15.

Next, in step S26, the image analysis server 14 determines whether, after the user is notified of the determination result in step S25, the user gives an OSD change instruction.

If the image analysis server 14 determines in step S26 that the user gives the OSD change instruction (YES in step S26), the processing proceeds to step S27. If the image analysis server 14 determines in step S26 that the user does not give the OSD change instruction (NO in step S26), the processing proceeds to step S28.

In step S27, the image analysis server 14 performs an OSD display change process according to the OSD change instruction given by the user in step S26. At this time, the superimposition information acquisition unit 35 changes the superimposition information management table 60 based on the OSD change instruction given by the user. Based on the changed superimposition information management table 60, the superimposition information drawing unit 34 performs a superimposition drawing process on an OSD.

Next, in step S29, based on the analysis setting change request acquired in step S23, the image analysis server 14 updates the contents of the analysis setting table 50 and applies the analysis settings.

If there is an OSD that influences the analysis process (YES in step S24), but if the user does not choose to change the display of the OSD (NO in step S26), then in step S28, the image analysis server 14 determines whether an analysis setting change instruction is given. If the analysis setting change instruction is given in step S28 (YES in step S28), the processing proceeds to step S29. In step S29, the image analysis server 14 applies the analysis setting change instruction, and then, the processing proceeds to step S30. In this case, since the display of the OSD is not changed, it is assumed that the display of the OSD has some influence on the analysis process.

If the analysis setting change instruction is not given in step S28 (NO in step S28), the image analysis server 14 does not change the display of the OSD or the analysis settings, and the processing proceeds to step S30.

In step S28, the image analysis server 14 determines whether the analysis settings specified in step S23 are to be changed. Alternatively, before step S28, the user may be allowed to provide an input to change the analysis settings again. In this case, the influence determination is to be made again. Thus, the processing returns to step S23.

In step S30, the image analysis server 14 determines whether the processing is to be ended. For example, the image analysis server 14 determines whether the processing is to be ended according to whether an instruction to end the analysis setting change process is received from the user. If the image analysis server 14 determines that the processing is to be ended (YES in step S30), the processing ends. If, on the other hand, the image analysis server 14 determines that the processing is not to be ended (NO in step S30), the processing returns to step S21. The processes of steps S21 to S29 are repeated until it is determined that the processing is to be ended.

As described above, the image analysis server 14 acquires pieces of OSD information superimposed on an image from the camera 12 or 16 and the image recording server 13, and when a detection setting or a detection region setting is made, selects displayed OSDs that influence the result of an analysis. Then, if any of the selected displayed OSDs has a possibility of influencing the analysis process, the image analysis server 14 notifies the user that the OSD influences the analysis process, or performs an OSD display change process. Consequently, the image analysis server 14 can prevent the display of the OSD from hindering the analysis process.

As described above, according to the above exemplary embodiment, an analysis unit performs an analysis process on an image, and an acquisition unit acquires superimposition information superimposed on the image. Further, based on a parameter for use in the analysis process on the image, an identification unit identifies superimposition information that influences the analysis process on the image, and a notification unit gives a notification regarding the superimposition information identified by the identification unit. Consequently, a user can notice the superimposition information that influences the image analysis. Thus, it is possible to reduce the influence of the superimposition information superimposed on the image on the image analysis.

Other Exemplary Embodiments

A plurality of exemplary embodiments among the above exemplary embodiments can be achieved in combination.

The disclosure can also be achieved by a program for achieving one or more functions of the above exemplary embodiments. That is, the disclosure can be achieved by the process of supplying the program to a system or an apparatus via a network or a storage medium and causing one or more processors of a computer (or a CPU or a microprocessor unit (MPU)) of the system or the apparatus to read and execute the program. The program recorded in a computer-readable recording medium may be provided.

The above exemplary embodiments may be applied to a system including a plurality of devices such as a host computer, an interface device, an imaging apparatus, and a web application, and may be applied to an apparatus composed of a single device.

The disclosure is not limited to the achievement of the functions of the exemplary embodiments by executing a program read by a computer. For example, based on an instruction from a program, an operating system (OS) operating on a computer may perform part or all of the actual processing, thereby achieving the functions of the above exemplary embodiments.

According to the above exemplary embodiment, it is possible to reduce the influence of superimposition information superimposed on an image on an image analysis.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-101485, filed Jun. 11, 2020, which is hereby incorporated by reference herein in its entirety.

What is claimed is:

1. An apparatus comprising a computer executing instructions that, when executer by the computer, cause the computer to:
    identify an area used for an image analysis process for an image, the area being set before the image analysis process is performed for the image;
    identify superimposition information superimposed on the image, the superimposition information being already superimposed on the image before the image analysis process for the image is performed; and
    perform a process regarding drawing of the identified superimposition information, in a case where the area used for the image analysis process for the image and an area of the identified superimposition information superimposed on the image overlaps with each other.

2. The apparatus according to claim 1, wherein the instructions cause the computer to provide, as the process regarding drawing of the identified superimposition information, a notification regarding the identified superimposition information.

3. The apparatus according to claim 2, wherein the instructions cause the computer to (a) perform a process to delete the identified superimposition information on the image, (b) perform a process to change a position of the superimposition information on the image, or (c) change a device which performs a superimposition process for superimposing the superimposition information on the image, based on user instruction after the notification is provided.

4. The apparatus according to claim 1, wherein the instructions cause the computer to, as the process regarding drawing of the identified superimposition information, perform a process to delete the identified superimposition information on the image.

5. The apparatus according to claim 1, wherein the instructions cause the computer to, as the process regarding drawing of the identified superimposition information, perform a process to change a display position of the identified superimposition information on the image.

6. The apparatus according to claim 1,
    wherein the instructions cause the computer to, as the process regarding drawing of the identified superimposition information, instructs a first device, having performed a superimposition process for superimposing the identified superimposition information on the image, not to perform the superimposition process for superimposing the identified superimposition information on the image, and
    wherein the instructions cause the computer to, as the process regarding drawing of the identified superimposition information, instructs a second device, that receives the image and a result of the analysis process after the analysis process is performed on the image, to perform a superimposition process for superimposing information having the same content as a content of the identified superimposition information subjected to the superimposition process by the first device.

7. The apparatus according to claim 1, wherein the superimposition information is a predetermined text.

8. The apparatus according to claim 1, wherein the instructions cause the computer to perform the image analysis process for the image.

9. The apparatus according to claim 1, wherein the image analysis process is corresponding to a moving detection, a person detection, a face authentication, or the tracking of a detected detection target.

10. A method comprising:
    identifying an area used for an image analysis process for an image, the area being set before the image analysis process is performed for the image;
    identifying superimposition information superimposed on the image, the superimposition information being already superimposed on the image before the image analysis process for the image is performed; and
    performing a process regarding drawing of the identified superimposition information, in a case where the area used for the image analysis process for the image and an area of the identified superimposition information superimposed on the image overlaps with each other.

11. The method according to claim 10, further comprising providing, as the process regarding drawing of the identified superimposition information, a notification regarding the identified superimposition information.

12. The method according to claim 10,
    wherein the process regarding drawing of the identified superimposition information includes (a) performing a process to delete the identified superimposition information on the image, (b) performing a process to change a position of the superimposition information on the image, or (c) changing a device which performs a superimposition process for superimposing the superimposition information on the image, based on user instruction after the notification is provided.

13. The method according to claim 10, wherein the process regarding drawing of the identified superimposition information includes performing a process to delete the identified superimposition information on the image.

14. The method according to claim 10, wherein the process regarding drawing of the identified superimposition information includes performing a process to change a display position of the identified superimposition information on the image.

15. The method according to claim 10,
    wherein the process regarding drawing of the identified superimposition information includes instructing a first device, having performed a superimposition process for superimposing the identified superimposition information on the image, not to perform the superimposition process for superimposing the identified superimposition information on the image, and
    wherein the process regarding drawing of the identified superimposition information includes instructing a second device, that receives the image and a result of the analysis process after the analysis process is performed on the image, to perform a superimposition process for superimposing information having the same content as a content of the identified superimposition information subjected to the superimposition process by the first device.

16. The method according to claim 10, wherein the superimposition information is a predetermined text.

17. The method according to claim 10, further comprising performing the image analysis process for the image.

18. The method according to claim 10, wherein the image analysis process is corresponding to a moving detection, a person detection, a face authentication, or the tracking of a detected detection target.

19. A non-transitory computer-readable storage medium storing a computer-executable program for causing a computer to perform a method, the method comprising:
- identifying an area used for an image analysis process for an image, the area being set before the image analysis process is performed for the image;
- identifying superimposition information superimposed on the image, the superimposition information being already superimposed on the image before the image analysis process for the image is performed; and
- performing a process regarding drawing of the identified superimposition information, in a case where the area used for the image analysis process for the image and an area of the identified superimposition information superimposed on the image overlaps with each other.

* * * * *